United States Patent
Cunningham et al.

(10) Patent No.: US 7,092,630 B2
(45) Date of Patent: Aug. 15, 2006

(54) OPEN FIBER CONTROL FOR OPTICAL TRANSCEIVERS

(75) Inventors: David G Cunningham, Cupertino, CA (US); Frederick Miller, San Jose, CA (US); Jing Wang, Fremont, CA (US); Janet Yun, Santa Clara, CA (US)

(73) Assignee: Avago Technologies Fiber IP(Singapore) Ptd. Ltd. (SG)

( * ) Notice: Subject to any disclaimer, the term of this patent is extended or adjusted under 35 U.S.C. 154(b) by 662 days.

(21) Appl. No.: 09/991,570

(22) Filed: Nov. 16, 2001

(65) Prior Publication Data

US 2003/0095303 A1    May 22, 2003

(51) Int. Cl.
*H04B 10/08* (2006.01)

(52) U.S. Cl. .................. 398/15; 398/177; 398/173; 398/10; 398/17; 398/21; 398/38; 398/135; 398/136; 398/137; 398/182; 398/138; 398/139; 398/197; 398/192; 398/202; 398/206; 398/208; 398/209; 398/213; 398/214; 385/18; 385/24

(58) Field of Classification Search ............... 398/177, 398/173, 206, 15, 197, 10, 17, 213, 21, 38, 398/214, 202, 182, 209, 135, 192, 208, 136, 398/137, 138, 139; 385/18, 24

See application file for complete search history.

(56) References Cited

U.S. PATENT DOCUMENTS

| 5,099,349 | A | * | 3/1992 | Yoshida et al. ............... 398/20 |
| 5,428,471 | A | | 6/1995 | McDermott |
| 6,359,708 | B1 | * | 3/2002 | Goel et al. .................. 398/15 |
| 6,483,616 | B1 | | 11/2002 | Maddocks et al. |
| 6,504,630 | B1 | * | 1/2003 | Czarnocha et al. ........... 398/15 |
| 6,633,430 | B1 | * | 10/2003 | Monnard et al. ...... 359/337.11 |
| 6,724,993 | B1 | * | 4/2004 | Koike et al. .................. 398/9 |
| 6,798,990 | B1 | * | 9/2004 | Brown et al. ................ 398/15 |
| 2003/0002109 | A1 | | 1/2003 | Hochberg et al. |

FOREIGN PATENT DOCUMENTS

| EP | 0581138 A1 | 2/1994 |
| EP | 1102423 A2 | 5/2001 |

* cited by examiner

*Primary Examiner*—Hanh Phan

(57) ABSTRACT

The present invention implements open fiber control in an optical transceiver. During normal operation, the transceiver transmits signals through a connection to an optical network. When the connection is intact, the total power transmitted can be greater than the eye-safety limit. When the connection breaks, the transceiver detects the loss of signal and disables transmissions over all channels except for one. The transceiver continues transmission on the single enabled channel at an eye-safe level. When the connection is fixed and a signal reappears, the transceiver detects the signal reappearance and re-enables all channels that had previously been disabled. By allowing the transceiver to transmit with greater optical power when the connection is intact, an increased data rate and longer transmission distances can be achieved. At the same time, safety is preserved, because transmissions drop to acceptable power levels whenever a break is detected.

20 Claims, 6 Drawing Sheets

OPEN FIBER CONTROL FOR OPTICAL TRANSCEIVERS

FIELD OF THE INVENTION

The invention is directed towards optical transceivers, and more specifically, towards the open fiber control of optical transceivers.

BACKGROUND OF THE INVENTION

Optical transceivers must be designed to transmit signals with sufficient power to meet the transmission distance and performance requirements of the system. At the same time, standard bodies such as the International Electrotechnical Commission (IEC) and the Center for Devices and Radiological Health (CDRH) have imposed limits on the magnitude of optical power that can be transmitted in a link between two transceivers, to protect the human eye in case of an open fiber. An open fiber is any discontinuity in the signal path that causes the signal light to escape into the open, e.g. a physical break in the optical fiber or an unplugged connector. Usually, an open fiber is the result of an unplugged connector. Unfortunately, these safety constraints limit the usefulness of multi-channel optical transceivers, which employ techniques such as multi-channel parallel transmission or wavelength division multiplexing (WDM).

Multiple fibers in a single ribbon cable are used to transmit data in multi-channel parallel transmission. The greater the number of fiber-optic cables used, the greater the amount of data can be transmitted. The fiber-optic cables are normally packed closely together in the ribbon cable, each fiber-optic cable constituting a single channel for signal transmission. Since the fiber-optic cables are closely packed, the optical power emitted from an end of an unconnected ribbon cable can be the optical power of several fiber-optic cables combined.

WDM combines multiple signals of different wavelengths into a single fiber for transmission. Using WDM, several signals can be transmitted at the same time along a single fiber, thus allowing a single fiber to transmit multiple channels of data. The optical power of the combined, transmitted signal is the sum of the power of each constituent signal.

These techniques enable transceivers to transmit at higher data rates by using multiple channels, but the total power transmitted still cannot exceed the eye-safety limits. The safeguards require that the combined power of the multiple channels be kept below the eye-safety limit. For example, if there are N channels in a multi-channel transceiver, and the power distribution between each channel is identical, each channel can operate at approximately only 1/Nth of the maximum eye safe power level. In this way, the combined power of the N channels does not exceed the maximum eye-safety level. However, reducing the power of the signals in each channel also reduces the distance the signals can travel without losing integrity. An optical network using reduced power signals will require more repeaters or higher sensitivity receivers to compensate for a weaker signal.

Open Fiber Control (OFC) is one way to circumvent the eye-safety constraints without endangering the human eye. OFC is a method for enabling and disabling laser transmissions in optical transceivers. When two transceivers are properly connected, each channel in a multiple channel application can be operated at eye-safety limits. Although the total optical power transmitted exceeds the eye-safety limits, there is no possibility of injury since no light escapes into the open. When an open fiber is detected, the transmissions must be either reduced to safe levels or shut down completely.

OFC may be implemented using software to control the optical transceivers. When an open fiber is detected, the software immediately shuts down transmissions from the transceiver. To re-establish the link, the software instructs each transceiver to periodically send out coded signal pulses in a handshake routine. However, it is difficult to synchronize and decode these signals, especially given varying link lengths and longer distances between transceivers. Therefore, OFC implemented in software is not widely adopted despite its advantages.

Recently, however, bandwidth requirements have increased to the point where multiple channel techniques like the ones described earlier are needed to accommodate the higher data rates. 1 Gigabit per second (Gbps) and 10 Gbps data rates are common now, and are sure to increase in the future. However, without using complicated OFC software routines, optical transceivers cannot currently transmit over multiple channels at high power without exceeding eye-safe levels.

SUMMARY OF THE INVENTION

In a preferred embodiment, the present invention is implemented by an optical transceiver that uses multiple channel techniques, e.g. multi-channel parallel transmission or WDM. During normal operation, the transceiver transmits all channels at power levels up to maximum eye-safety levels. Although the total optical power transmitted exceeds the eye-safety level, no harm occurs since the connections are intact. When an open fiber is detected, all but one of the channels in the transmitter is disabled. The remaining channel continues transmission at an eye-safe level and is used to detect when the link is reestablished. Once the connection is reestablished, all channels resume normal operation. The channels are enabled or disabled in a time span on the order of milliseconds, satisfying the initialization timing requirements of typical protocols such as Fibre Channel, Ethernet, etc. By allowing the transceiver to transmit with greater optical power when the cables are connected, an increased data rate can be attained since more channels can be transmitted, and signals can travel longer distances without loss of integrity. At the same time, eye safety is preserved, because transmissions automatically subside to acceptable power levels whenever a break is detected. Additionally, the complicated synchronization and signal decoding required by the prior art software OFC implementation is avoided completely.

Further features and advantages of the present invention, as well as the structure and operation of preferred embodiments of the present invention, are described in detail below with reference to the accompanying exemplary drawings. In the drawings, like reference numbers indicate identical or functionally similar elements.

DETAILED DESCRIPTION

Figure 1A:
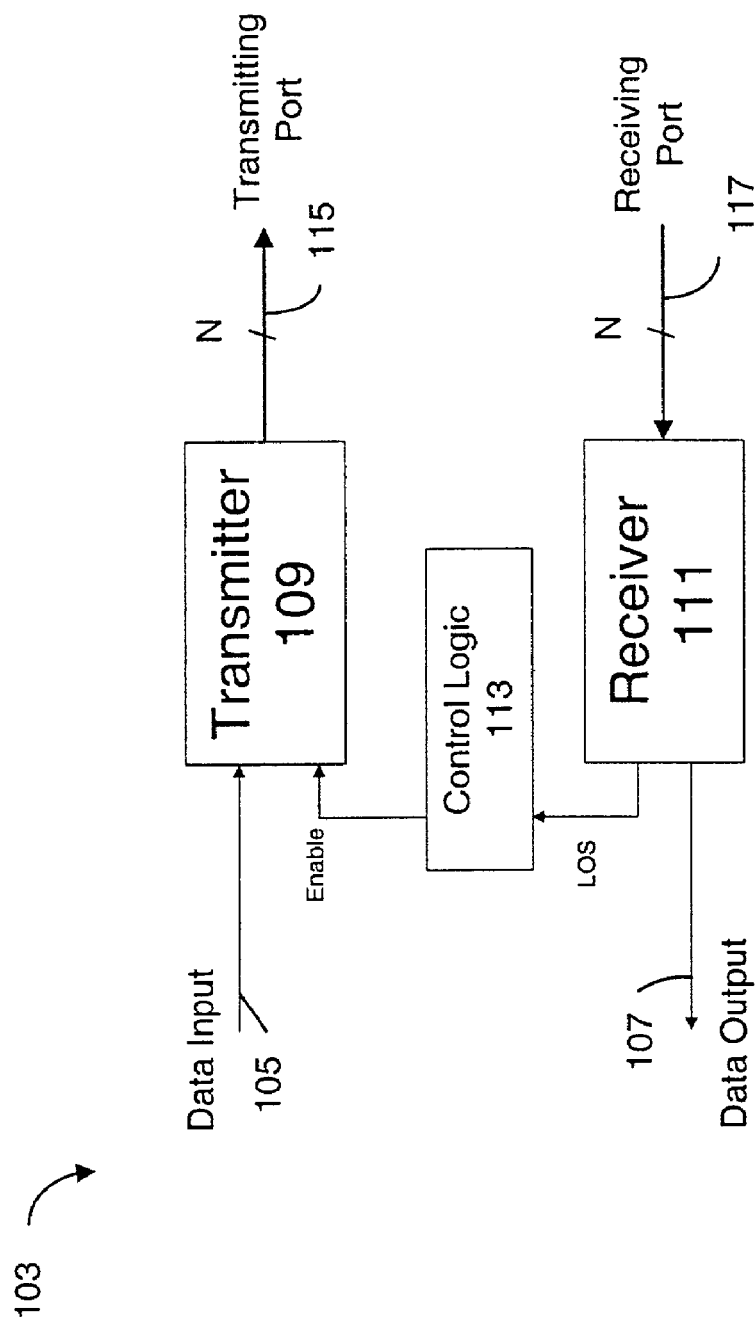
FIG. 1A is a block diagram of the present invention.

FIG. 1A is a block diagram showing a preferred embodiment of the present invention. Optical transceiver 103 has a data input 105, a data output 107, a transmitter 109, a receiver 111, and control logic 113. Transmitter 109 transmits N channels at transmitting port 115. Receiver 111 receives N channels at receiving port 117 and determines whether a signal is present. When receiver 111 detects a signal, optical transceiver 103 is properly connected. When no signal is detected, an open fiber exists. Receiver 111 indicates to control logic 113 whether a signal is present by asserting or de-asserting a Loss of Signal (LOS) control line. Control logic 113 enables or disables N−1 channels of transmitter 109 with an Enable control line.

Figure 1B:
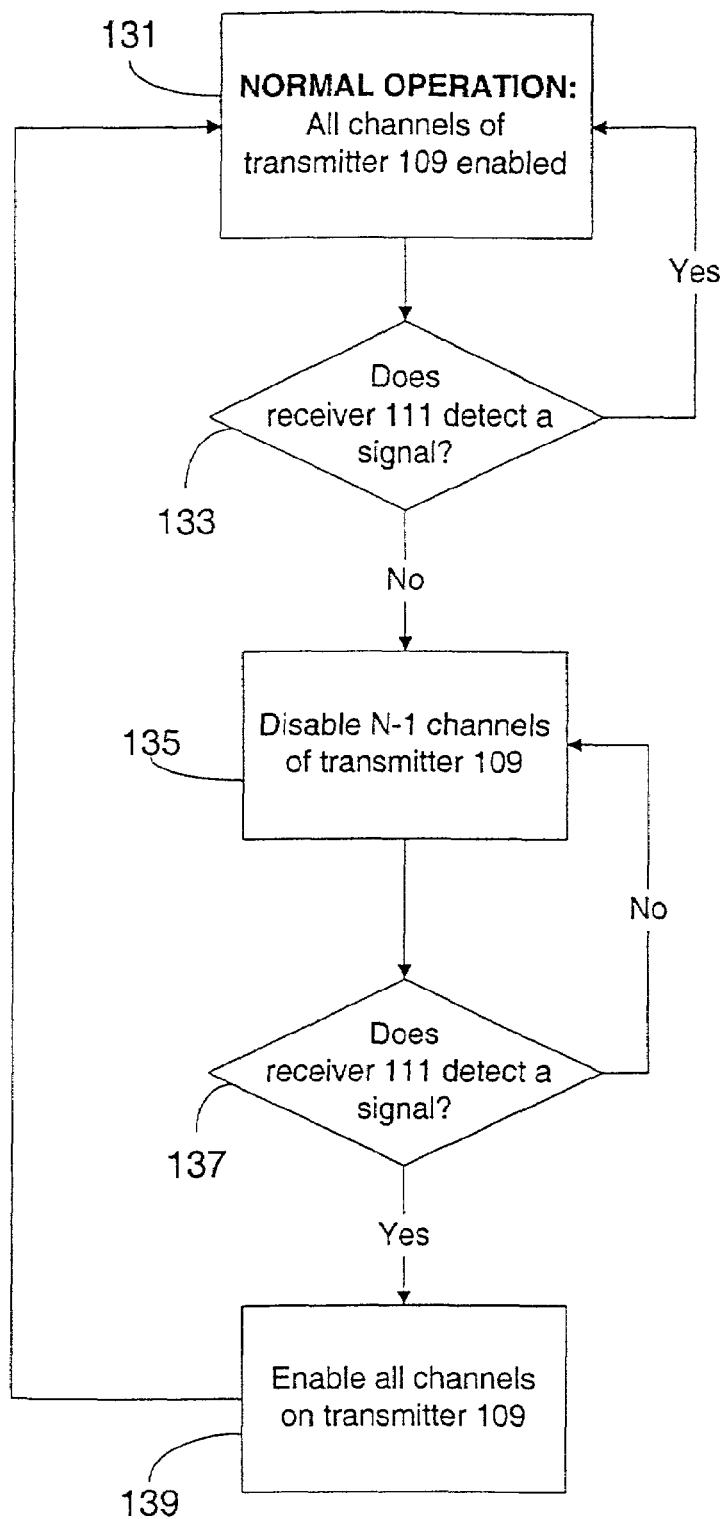
FIG. 1B is a flow chart of the present invention.

FIG. 1B is a flow chart describing OFC in optical transceiver 103, according to the present invention. During normal operation in step 131, the optical transceiver 103 has an intact connection to an optical network, and all N channels of transmitter 109 are enabled. Each channel transmits at up to the maximum eye-safe power level set by the standard bodies, which means the optical power of all N channels can add up to be N times the eye-safe power level. This would be a dangerous power level in an open fiber, but the present invention ensures that the connection is intact and safe for transmission at this high power level. Next, in step 133, receiver 111 checks for a signal. When receiver 111 detects a signal, optical transceiver 103 remains in normal operation. However, when receiver 111 does not detect a signal, it asserts the LOS control line to control logic 113. Control logic 113, in response, disables N−1 channels of transmitter 109 in step 135. The transmitted power level drops to that of a single channel. Although light is escaping into the open somewhere along the connection, the escaping light is at a safe power level, since the single channel is already transmitting at or below the maximum eye-safe power level. In step 137, receiver 111 continues to check for a signal. When no signal is detected, N−1 channels of transmitter 109 remain disabled. When receiver 111 does detect a signal, it de-asserts the LOS control line to control logic 113. In step 139, control logic 113 then enables all channels on transmitter 109, returning optical transceiver 103 to normal operation.

Figure 2A:
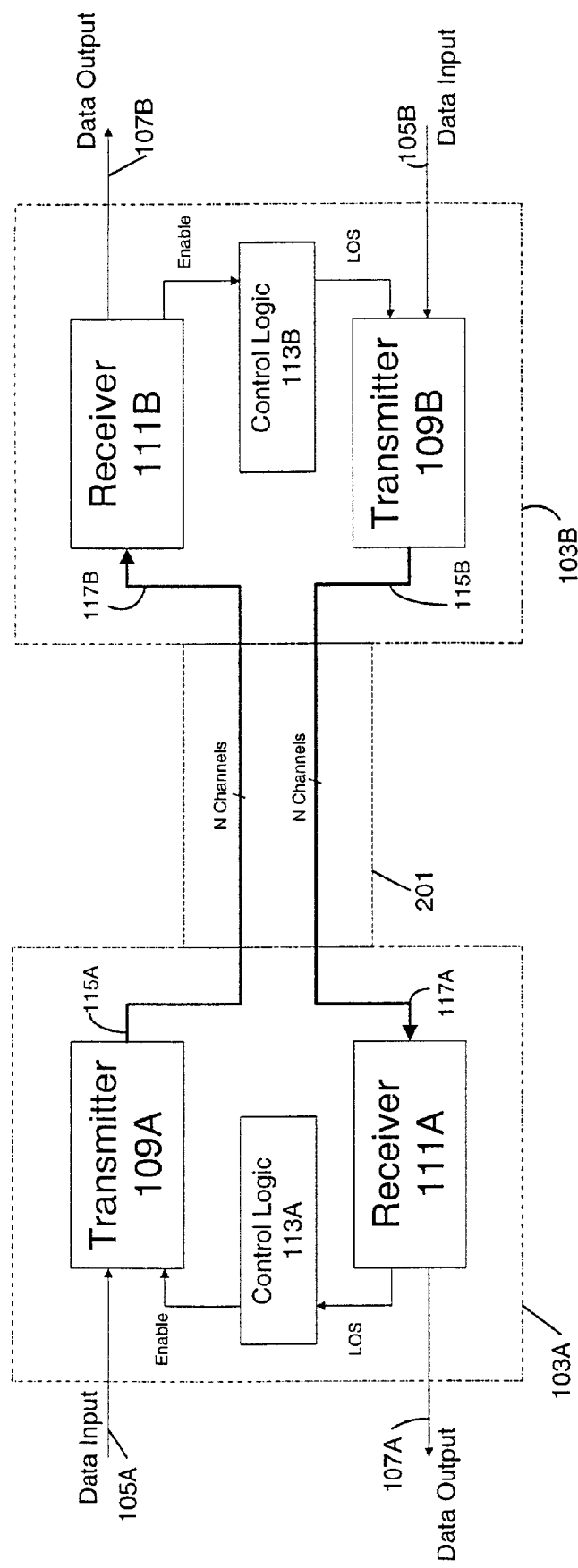
FIG. 2A is a block diagram of the present invention in an exemplary optical network.

FIG. 2A is a block diagram of the present invention in an exemplary optical network. Cable 201 connects optical transceiver 103A and optical transceiver 103B. Transmitting port 115A of transmitter 109A is connected through cable 201 to receiving port 117B of receiver 111B. Transmitting port 115B of transmitter 109B is also connected through cable 201 to receiving port 117A of receiver 111A.

Figure 2B:
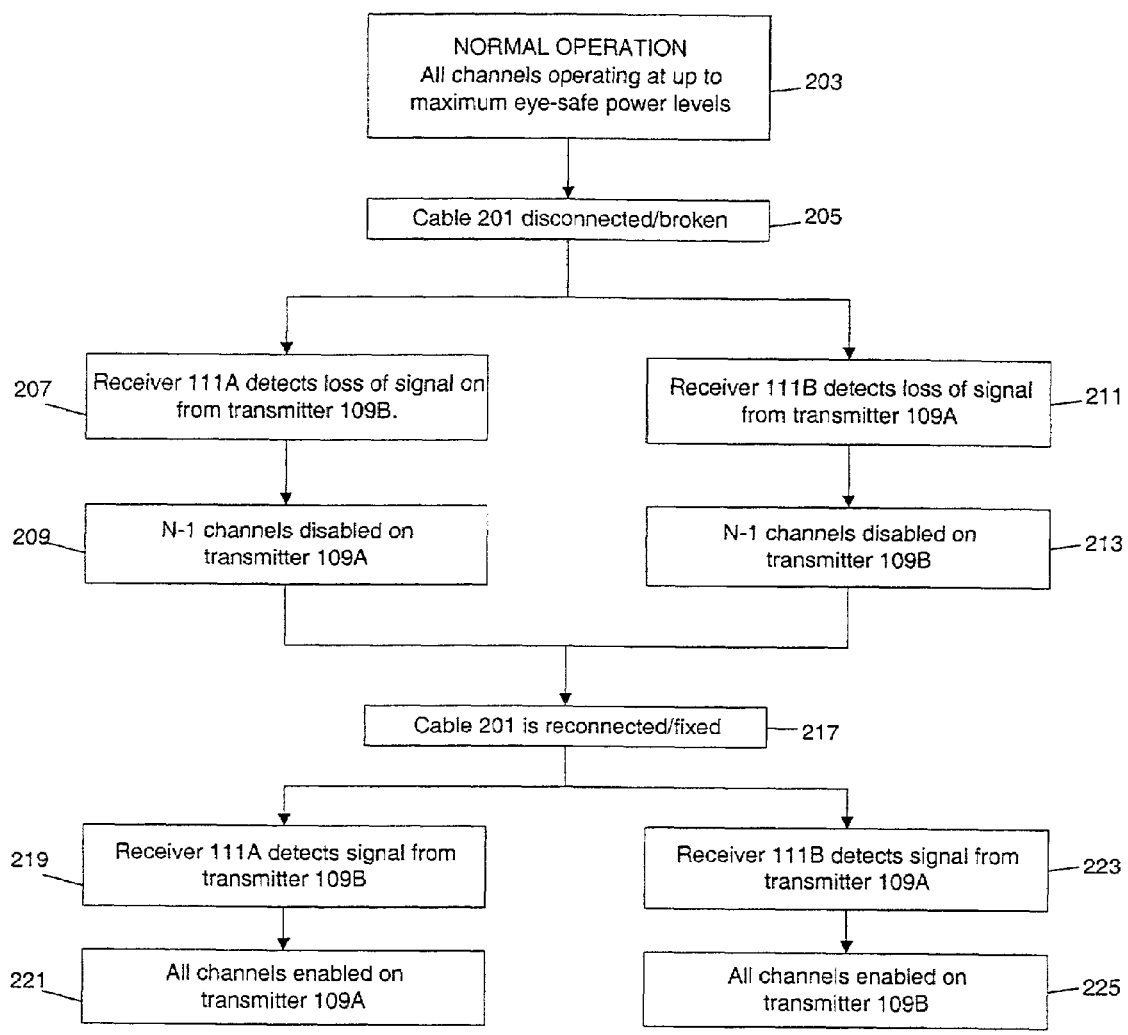
FIG. 2B is a flow chart of the present invention in an exemplary optical network.

FIG. 2B is a flow chart describing OFC in the exemplary optical network of FIG. 2A. During normal operation in step 203, all channels of each optical transceiver 103A, 103B are transmitting and receiving signals. The combined optical power transmitted over the N channels can be greater than eye-safety limits, since cable 201 is properly connected.

In step 205, cable 201 between optical transceivers 103A and 103B is either disconnected or broken, creating an open fiber. In step 207, receiver 111A detects the loss of signal from transmitter 109B and asserts its Loss of Signal control line. In response, control logic 113A disables N−1 channels of transmitter 109A in step 209. Transmitter 109A continues to transmit over the remaining channel at an eye-safe power level. Similarly, in step 211, receiver 111B also detects the loss of signal from transmitter 109A and asserts its Loss of Signal control line. Control logic 113B subsequently disables N−1 channels of transmitter 109B in step 213. Transmitter 109B continues to transmit over its single remaining channel at an eye-safe power level.

Although the link is broken and light may be escaping into the open, there is no danger to anyone working on the system because the total transmissions have been reduced to a safe power level. By disabling N−1 channels, the total power level drops to that of the single remaining channel, which was already transmitting at or below the maximum eye-safe power level. By keeping one channel operating on each transmitter 109A, 109B, the system can detect when the link is re-established. A specific channel on each transmitter 109A, 109B can be designated to be the remaining channel for transmission, or control signals can be added to each control logic 113A, 113B to select one of the N channels of each transmitter 109A, 109B.

In step 217, when cable 201 is fixed, the link between optical transceiver 103A and optical transceiver 103B is re-established. In step 219, receiver 111A detects the signal transmitting on a single channel from transmitter 109B. Receiver 111A signals to control logic 113A that the link has been fixed by de-asserting its Loss of Signal control line. In step 221, control logic 113A then enables all channels on transmitter 109A for transmission. Likewise at transceiver 103B in step 223, receiver 111B detects the signal transmitting on one channel from transmitter 109A when the link is re-established. Receiver 111B signals to control logic 113B that the link has been fixed by de-asserting its Loss of Signal control line. In step 225, control logic 113B then enables all channels on transmitter 109B for transmission. Normal operation is thereby resumed, wherein each channel is transmitting at maximum eye-safe power levels.

Figure 3A:
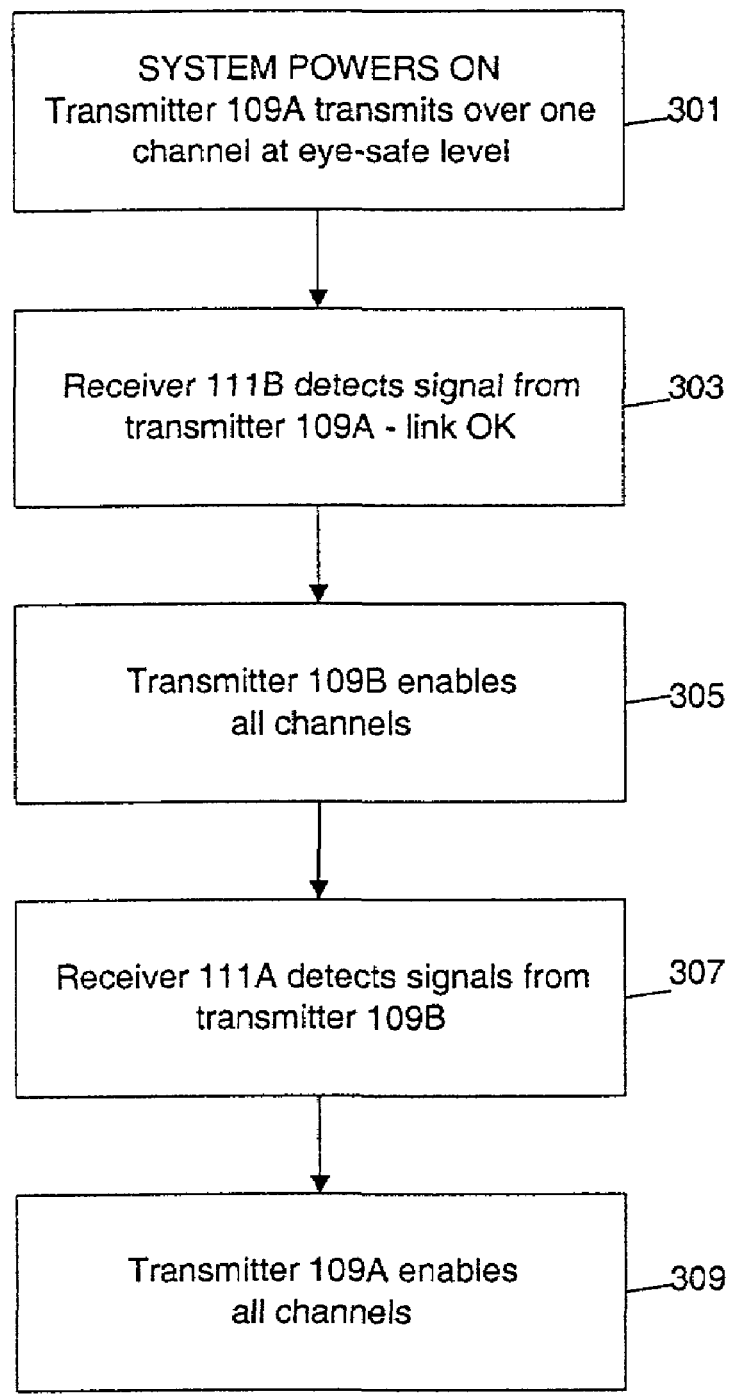
FIG. 3A is a flow chart describing system initialization.

FIG. 3A is a flow chart describing system initialization for the exemplary optical network of FIG. 2A. At start-up in step 301, a single channel within transmitter 109A is enabled. The single channel transmits at an eye-safe level, in case the cable is unplugged. In step 303, receiver 111 detects the signal from transmitter 109A, indicating a good connection. In step 305, transmitter 109B begins transmissions on all channels. In step 307, receiver 111A detects the signals from transmitter 109B. Finally, in step 309, transmitter 109A enables its remaining channels for transmission. The system is powered up, the connection has been verified, and normal operation begins, wherein each channel is transmitting at maximum eye-safe power levels.

Figure 3B:
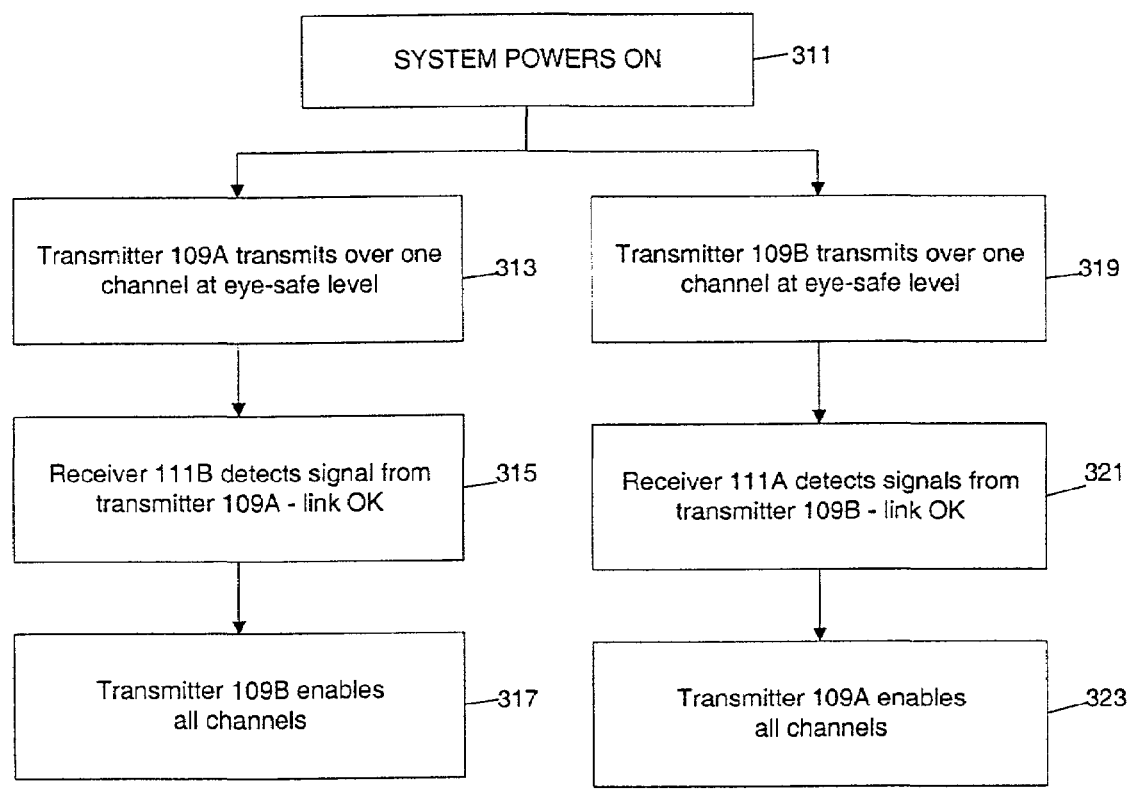
FIG. 3B is a flow chart describing an alternate method for system initialization.

FIG. 3B is a flow chart describing an alternate method for system initialization. At system power-on in step 311, both transmitter 109A and 109B are simultaneously initialized, with a single channel enabled on each transmitter (steps 313 & 319). In step 315, receiver 111B detects the signal from transmitter 109A. Likewise in step 321, receiver 111A detects the signal from transmitter 109B. In step 317, transmitter 109B enables all its channels. At the same time in step 323, transmitter 109A will enable all of its remaining channels, thus beginning normal operation.

Although the present invention has been described in detail with reference to particular preferred embodiments, persons possessing ordinary skill in the art to which this invention pertains will appreciate that various modifications and enhancements may be made without departing from the spirit and scope of the claims that follow. For example, this method will work not only when a cable is unplugged, but also in case a transmitter or a receiver in either transceiver should malfunction. Additionally, transmission power in each channel may be above eye-safety limits during normal operation, if the transmission power of the single remaining, enabled channel can be adjusted to eye-safe limits when a break is detected.

We claim:

1. A method for performing open fiber control for at least one optical transceiver in an optical network, comprising:
   simultaneously transmitting output signals on respective output channels;
   detecting a loss of signal;
   in response to a successful detection of the loss of signal, maintaining the transmitting of one of the output signals on a designated one of the output channels while disabling the transmitting of the output signals on all but the designated one of the output channels; and
   in response to a failure to detect the loss of signal, re-enabling the transmission of the output signals whose transmission had previously been disabled.

2. The method of claim 1, wherein the maintaining step comprises transmitting the output signal on the designated output channel at a predetermined power level up to a specified maximum eye-safe power level.

3. The method of claim 2, wherein the output signals are transmitted on the respective output channels at a total power above the predetermined power level.

4. The method of claim 3, wherein the step of transmitting comprises simultaneously transmitting the output signals on respective optical fibers.

5. The method of claim 4, wherein the step of transmitting has a data rate greater than 1 Gbps.

6. The method of claim 5, wherein the step of transmitting has a data rate greater than 10 Gbps.

7. The method of claim 3, wherein the step of transmitting uses wavelength division multiplexing.

8. The method of claim 7, wherein the step of transmitting has a data rate greater than 1 Gbps.

9. The method of claim 8, wherein the step of transmitting has a data rate greater than 10 Gbps.

10. The method of claim 1, wherein the transmitting of each of the output signals is at or above a specified maximum eye-safe power level.

11. An optical transceiver for performing open fiber control, comprising:
   a transmitter that simultaneously transmits output signals on respective output channels;
   a receiver that detects a loss of signal; and
   a control logic block coupled to the transmitter and the receiver and configured to
     direct the transmitter to maintain transmission of one of the output signals on a designated one of the output channels while disabling transmission of the output signals on all but the designated one of the output channels in response to a successful detection of the loss of signal by the receiver, and
     direct the transmitter to re-enable transmission of the output signals whose transmission had previously been disabled in response to a failure of the receiver to detect the loss of signal.

12. The optical transceiver as in claim 11, wherein, in response to a successful detection of the loss of signal by the receiver, the controller directs the transmitter to transmit the output signal on the designated output channel at a predetermined power level up to a specified maximum eye-safe power level.

13. The optical transceiver as in claim 12, wherein the transmitter transmits the output signals on the respective output channels at a total power level above the predetermined power level.

14. The optical transceiver as in claim 13, wherein the transmitter simultaneously transmits the output signals on respective optical fibers.

15. The optical transceiver as in claim 14, wherein the transmitter transmits at a data rate greater than 1 Gbps.

16. The optical transceiver as in claim 15, wherein the transmitter transmits at a data rate greater than 10 Gbps.

17. The optical transceiver as in claim 13, wherein the transmitter simultaneously transmits the output signals using wavelength division multiplexing.

18. The optical transceiver as in claim 17, wherein the transmitter transmits at a data rate greater than 1 Gbps.

19. The optical transceiver as in claim 18, wherein the transmitter transmits at a data rate greater than 10 Gbps.

20. The optical transceiver of claim 11, wherein the transmitter transmits each of the output signals at or above a specified maximum eye-safe power level.

* * * * *